United States Patent [19]

Yanagihara et al.

[11] Patent Number: 5,467,757
[45] Date of Patent: Nov. 21, 1995

[54] COMPRESSION-IGNITION TYPE ENGINE AND COMBUSTION METHOD OF SAME

[75] Inventors: Hiromichi Yanagihara, Gotemba; Yasuo Sato; Akio Kawaguchi, both of Susono, all of Japan

[73] Assignee: Toyota Jidosha Kabushiki Kaisha, Toyota, Japan

[21] Appl. No.: 290,254

[22] Filed: Aug. 15, 1994

[30] Foreign Application Priority Data

Aug. 20, 1993 [JP] Japan ..................... 5-206432
May 23, 1994 [JP] Japan ..................... 6-108560

[51] Int. Cl.$^6$ ................................ F02B 5/00
[52] U.S. Cl. ....................... 123/305; 123/27 R
[58] Field of Search ..................... 123/294, 30 J, 123/27 R, 299, 276

[56] References Cited

U.S. PATENT DOCUMENTS

| | | | |
|---|---|---|---|
| 2,977,942 | 4/1961 | Reynolds | 123/305 |
| 4,572,133 | 2/1986 | Bago | 123/294 |
| 4,920,937 | 5/1990 | Sasaki et al. | 123/305 |
| 4,924,828 | 5/1990 | Oppenheim | 123/299 |
| 5,170,759 | 12/1992 | Ito | 123/276 |
| 5,205,254 | 4/1993 | Ito et al. | 123/305 |
| 5,211,145 | 5/1993 | Ichikawa et al. | 123/295 |
| 5,265,562 | 11/1993 | Kruse | 123/27 R |

FOREIGN PATENT DOCUMENTS

| | | | |
|---|---|---|---|
| 195736 | 2/1986 | European Pat. Off. | 123/305 |
| 459429 | 5/1991 | European Pat. Off. | 123/305 |
| 60-256523 | 12/1985 | Japan | 123/305 |
| 61-11448 | 1/1986 | Japan | 123/305 |
| 61-149568 | 7/1986 | Japan | 123/305 |
| 62-87609 | 4/1987 | Japan | 123/305 |
| 62-255556 | 11/1987 | Japan | 123/305 |
| 3-160150 | 7/1991 | Japan | 123/305 |
| 4-19355 | 1/1992 | Japan . | |
| 4-308356 | 10/1992 | Japan | 123/305 |

Primary Examiner—Raymond A. Nelli
Attorney, Agent, or Firm—Kenyon & Kenyon

[57] ABSTRACT

A compression-ignition type engine in which fuel is injected in a combustion chamber during the compression stroke or intake stroke before 60 degrees before top dead center of the compression stroke and in which the mean particle size of the fuel injected at that time is made a size in which the temperature of the fuel particles reaches the boiling point of the main fuel component, determined by the pressure in the combustion chamber, at substantially the top dead center of the compression stroke. After the injection and until about the top dead center of the compression stroke is reached, evaporation of the fuel by boiling from the fuel particles is prevented and the fuel of the fuel particles boils and evaporates and fuel is ignited and burnt after about the top dead center of the compression stroke.

22 Claims, 16 Drawing Sheets

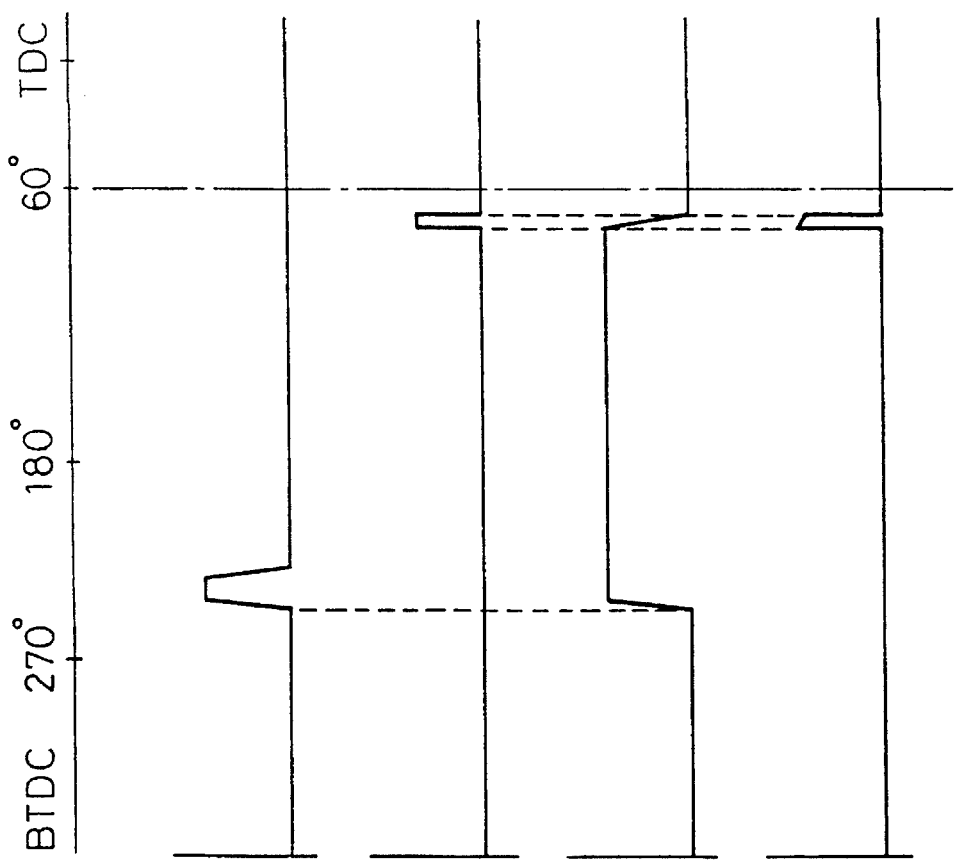

IN CHAMBER

Fig.19
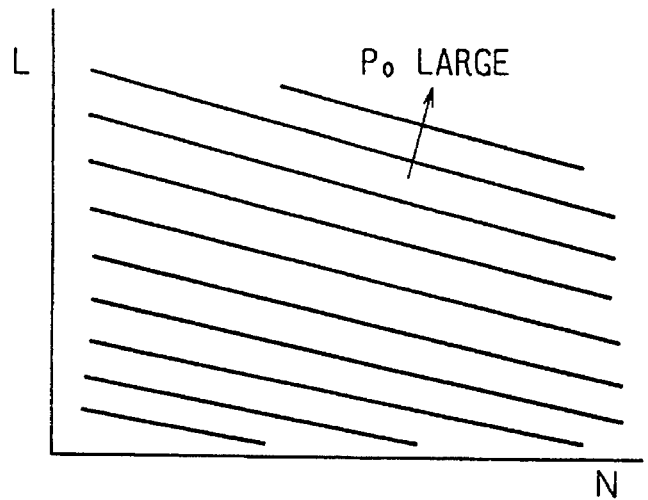
Fig. 20a
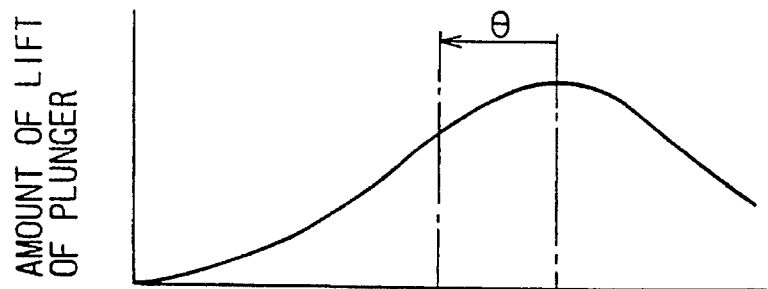
Fig. 20b
Fig. 20c
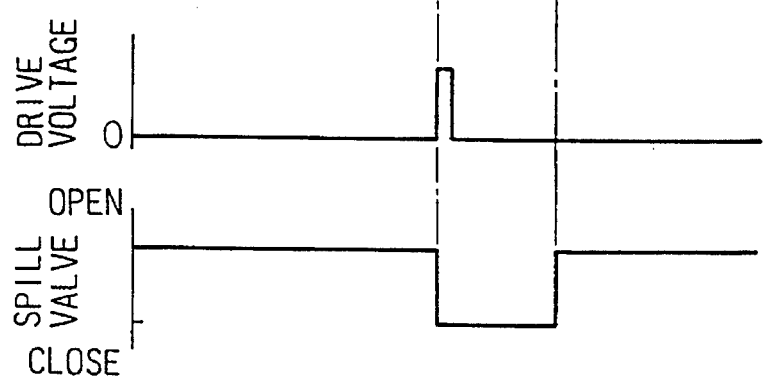

COMPRESSION-IGNITION TYPE ENGINE AND COMBUSTION METHOD OF SAME

BACKGROUND OF THE INVENTION

1. Field of the Invention

The present invention relates to a compression-ignition type engine and a combustion method of the same.

2. Description of the Related Art

In a usual compression-ignition type engine, fuel of a mean particle size of about 20 μm to 50 μm or less is injected into the combustion chamber after about 30 degrees before top dead center in the compression stroke. Further, in the special compression-ignition type engine described in Japanese Unexamined Patent Publication (Kokai) No. 60-256523, an intake throttle valve is arranged in the intake passage or an exhaust throttle valve is arranged in the exhaust passage, the fuel injection timing is advanced to 120 degrees before top dead center, and at least one of the intake throttle valve or exhaust throttle valve is closed at the time of a low engine load operation.

However, in an ordinary compression-ignition type engine wherein fuel of an average particle size from 20 μm to 50 μm or less than that is made to be injected after 30 degrees or so before top dead center of the compression stroke, part of the injected fuel is immediately vaporized just when the injection is begun. The succeeding fuel enters into the flame of combustion of the vaporized fuel and thus the injected fuel is successively burned. If the fuel entering into the flame of combustion is made to be successively burned in this way, however, the fuel will be burned in a state of air shortage, so a large amount of unburnt HC or soot will be generated.

In such a compression-ignition type engine, further, the fuel injection is formed in a limited region and therefore the combustion is performed in a limited region in the combustion chamber. If combustion is performed in such a limited region, the local combustion temperature becomes higher than compared with the case where combustion is carried out in the entire interior of the combustion chamber, and accordingly a large amount of $NO_x$ is produced. Further, the smaller the particle size of the injected fuel, the greater the fuel vaporizing immediately upon injection, so the severer the sudden pressure rise caused by the explosive combustion when the ignition delay time passes after the start of the injection and as a result the higher the combustion temperature, so the still greater amount of $NO_x$ which is produced.

Further, in the compression-ignition type engine described in Japanese Unexamined Patent Publication (Kokai) No. 60-256523, the intake throttle valve or the exhaust throttle valve is closed at the time of a low engine load operation so as to increase the amount of the residual burnt gas in the combustion chamber and the heat of that residual burnt gas is used to heat the injected fuel and radicalize the fuel molecules. In this compression-ignition type engine as well, however, the same combustion is performed as in the ordinary compression-ignition type engine other than at the time of a low engine load operation, so at that time a large amount of soot and $NO_x$ are produced.

In this way, so long as the conventional combustion method is used, it is impossible to avoid the production of soot and $NO_x$ and accordingly it is necessary to make fundamental changes to the combustion method in order to prevent the generation of soot and $NO_x$.

SUMMARY OF THE INVENTION

An object of the present invention is to provide a compression-ignition type engine and a combustion method of the same which are capable of reducing the amount of generation of soot and $NO_x$ to almost zero.

According to an aspect of the present invention, there is provided a compression-ignition type engine having a combustion chamber, comprising injection means for injecting fuel in the combustion chamber and forming fuel droplets dispersed in the combustion chamber, the mean value of the particle size of the fuel droplets being larger than a predetermined particle size at which the temperature of the fuel droplets having the predetermined particle size reaches a boiling point of a main ingredient of the fuel, which boiling point is determined by pressure in the combustion chamber, at substantially the top dead center of the compression stroke and control means for controlling the injection means to carry out an injecting operation by the injection means at a predetermined timing during a period from the start of an intake stroke to approximately 60 degrees before top dead center of the compression stroke.

In addition, according to another aspect of the present invention, there is provided a combustion method of a compression-ignition type engine having a combustion chamber, comprising the steps of injecting fuel in the combustion chamber at a predetermined timing during a period from the start of an intake stroke to 60 degrees before top dead center of the compression stroke; forming fuel droplets diffused in the combustion chamber, the mean value of the particle size of said fuel droplets being larger than a predetermined particle size at which the temperature of the fuel droplets having the predetermined particle size reaches a boiling point of a main ingredient of the fuel, which boiling point is determined by pressure in the combustion chamber, at about the top dead center of the compression stroke; preventing fuel from being vaporized by boiling from the fuel droplets until a crankshaft reaches about top dead center of the compression stroke after the injection of fuel is started; and vaporizing fuel from the fuedl droplets by boiling and starting combustion of vaporized fuel after about the top dead center of the compression stroke.

The present invention may be more fully understood from the description of the preferred embodiments of the invention set forth below together with the accompanying drawings.

BRIEF DESCRIPTION OF THE DRAWINGS

In the drawings,

FIG. 11 is a time chart of the fuel injection control;

FIGS. 12A, 12B, and 12C are views of the fuel pressure etc. in the fuel storage chamber;

FIG. 19 is a graph of the target fuel pressure $P_0$;

FIG. 20 is a view of the opening and closing operation of a spill valve;

DESCRIPTION OF THE PREFERRED EMBODIMENTS

Figure 1:
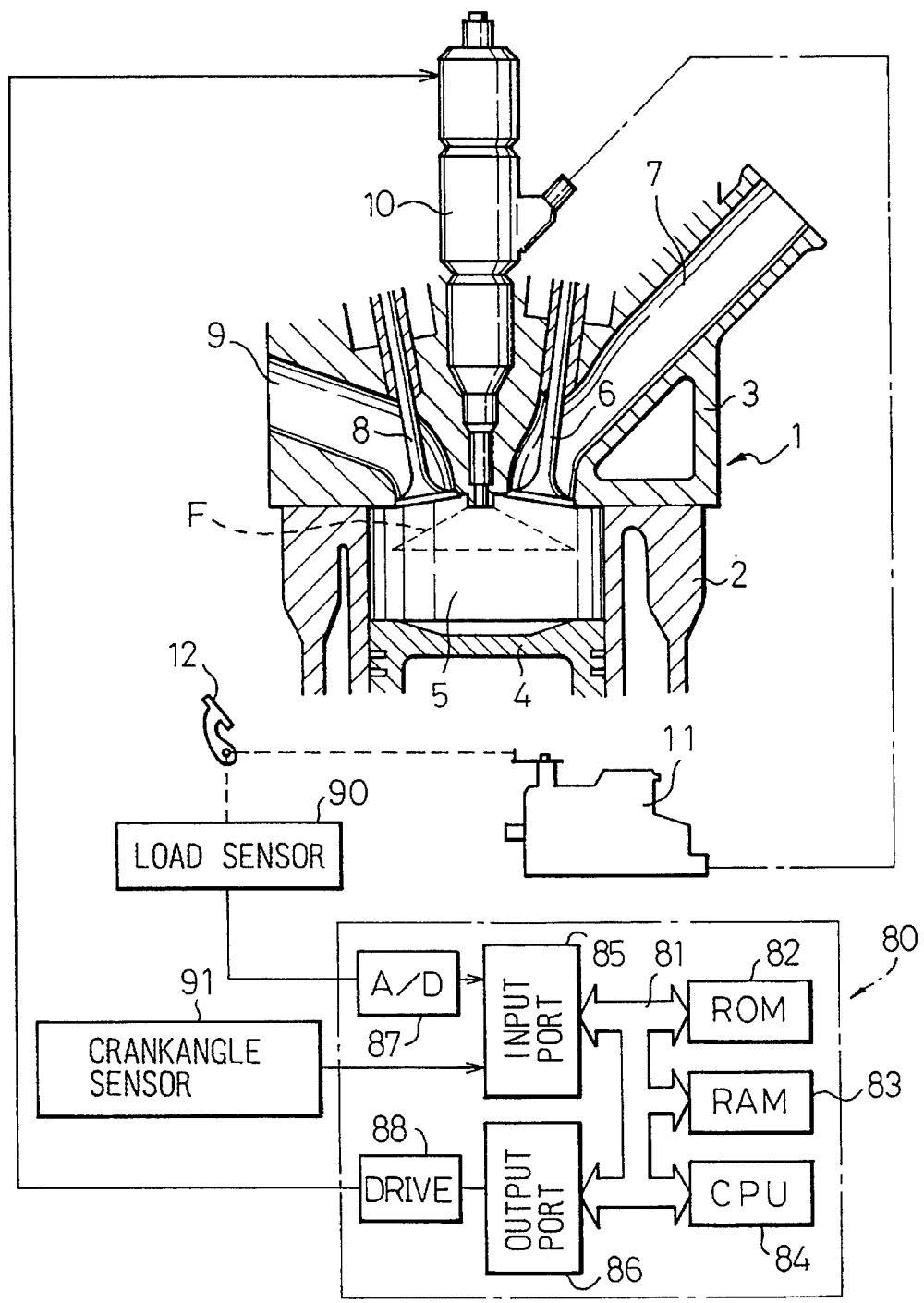
FIG. 1 is a side sectional view of a compression-ignition type engine.
Figure 2:
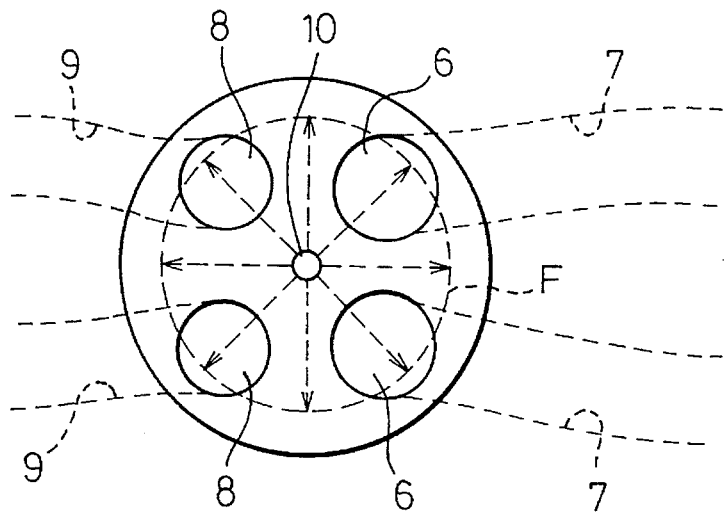
FIG. 2 is a bottom view of a cylinder head of FIG. 1.

FIGS. 1 and 2 show the case of application of the present invention to a four-stroke compression-ignition type engine.

Referring to FIG. 1 and FIG. 2, 1 designates an engine body, 2 a cylinder block, 3 a cylinder head, 4 a piston, 5 a combustion chamber, 6 a pair of intake valves, 7 a pair of intake ports, 8 a pair of exhaust valves, 9 a pair of exhaust ports, 10 a fuel injector arranged at the top center of the combustion chamber 5, and 11 an engine driven injection pump. The intake ports 7 are each comprised of a straight port extending substantially straight. Therefore, in the compression-ignition type engine shown in FIG. 1 and FIG. 2, a swirl cannot be produced in the combustion chamber 5 by the flow of air from the intake port 7 to the combustion chamber 5.

Figure 3:
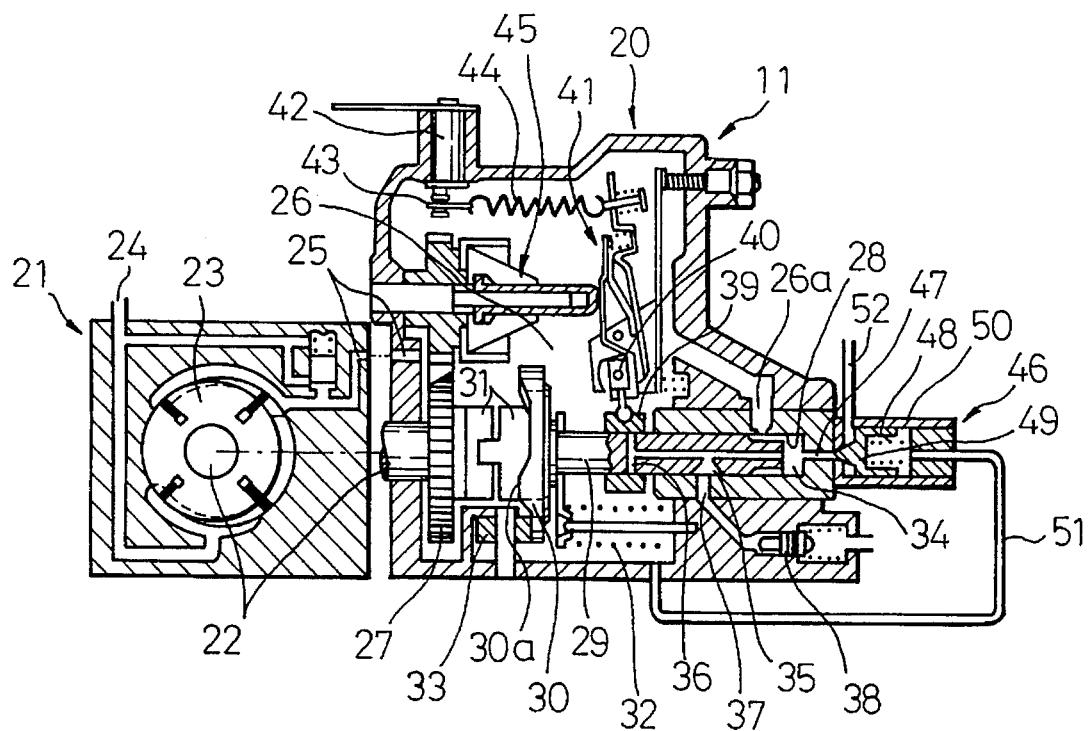
FIG. 3 is a side sectional view of an injection pump.

FIG. 3 is a side sectional view of the injection pump 11. Referring to FIG. 3, 20 is an injection pump body and 21 a fuel supply pump. To facilitate understanding of the structure, the fuel supply pump 21 is shown rotated 90 degrees. The fuel supply pump 21 has a rotor 23 attached on a drive shaft 22 driven by the engine. Fuel taken in from the fuel supply port 24 passes via the rotor 23 and is discharged from a fuel discharge port 25 to a fuel pressurizing chamber 26 in the fuel pump body 20. The inside end of the drive shaft 22 projects out into the fuel pressurizing chamber 26. A gearwheel 27 is attached to the inside end of the drive shaft 22.

On the other hand, one end of a plunger 29 is inserted into the cylinder 28 formed in the fuel pump body 20. The other end of the plunger 29 is connected to a cam plate 30 formed with the same number of cam profiles 330a as the number of cylinders. The inside end of the drive shaft 22 is connected to the cam plate 30 through a coupling 31 able to transmit the rotational force. The cam plate 30 is pressed on a roller 33 by the spring force of a compression spring 32. When the drive shaft 22 turns and the cam profiles 30a of the cam plate 30 engage with the roller 33, the plunger 29 moves in the axial direction. Accordingly, the plunger 29 is made to rotate and move reciprocatively.

A pressurizing chamber 34 is formed at the front end of the plunger 29. Inside the plunger 29 are formed a fuel discharge port 35 and fuel spill port 36 communicating with the pressurizing chamber 34. Around the plunger 29 are formed the same number of fuel discharge passages 37 as the number of cylinders at equiangular intervals. The fuel discharge passages 37 are communicated with the corresponding fuel injectors 10 through a check valve 38. On the other hand, a spill ring 39 for controlling the opening and closing of the fuel spill port 36 is inserted above the plunger 29. The position of the spill ring 39 is controlled by a control link mechanism 41 supported rotatably around a pivot pin 40.

The top end of the control link mechanism 41 is connected through a tension spring 44 to an eccentric pin 43 fixed to a rotational shaft 42. The rotational shaft 42 is connected to an accelerator pedal 12 (FIG. 1) and made to rotate by the accelerator pedal 12. Further, inside of the pressurized fuel chamber 26 is provided a governor mechanism 45 which biases the control link mechanism 41 in the clockwise direction the higher the rotational speed. The pressurized fuel inside the fuel pressurizing chamber 26 is supplied from a fuel supply port 26a to the inside of the pressurizing chamber 34. The fuel in the pressurizing chamber 34 is compressed as the plunger 29 is moved to the right. Next, when the fuel discharge port 35 formed in the plunger 29 is communicated with one of the fuel discharge passages 37, the pressurized fuel in the pressurizing chamber 34 is supplied through the check valve 38 to the corresponding fuel injector 10.

Next, when the plunger 29 moves further to the right and the fuel spill port 36 opens inside the fuel pressurizing chamber 26, the supply of fuel to the fuel injector 10 is stopped. The time at which the fuel spill port 36 opens to the fuel pressurizing chamber 26 changes depending on the position of the spill valve 39 and therefore the amount of the fuel supplied to the fuel injector 10 is controlled by the position of the spill valve 39. The position of the spill valve 39 is controlled so that the amount of the fuel supplied to the fuel injector 10 is increased the greater the amount of depression of the accelerator pedal 12 (FIG. 1) and so that the amount of fuel supplied to the fuel injector 10 is decreased the higher the engine rotational speed.

As shown in FIG. 3, an injection pressure control valve 46 is attached to the fuel pump body 11. The injection pressure control valve 46 is comprised of a fuel spill port 47 communicated with the inside of the pressurizing chamber 34, a valve body 49 which normally closes the fuel spill port 47 by the spring force of the compression spring 48, and a back pressure chamber 50 of the valve body 49. The back pressure chamber 50 is connected with the fuel pressurizing chamber 26 through a conduit 51. When the fuel in the pressurizing chamber 34 is compressed by the plunger 29, if the fuel pressure in the pressurizing chamber 34 becomes higher than the valve opening pressure of the valve body 49, the fuel inside the pressurizing chamber 34 spills through the fuel spill port 47, then the spilling fuel is returned into the fuel pressurizing chamber 26 through the conduit 52. Accordingly, the maximum fuel pressure inside the pressurizing chamber 34 is determined by the valve opening pressure of the valve body 49 and the maximum pressure of the fuel supplied to the fuel injector 10 is determined by the valve opening pressure of the valve body 49 as well.

The higher the engine rotational speed, however, the greater the amount of discharge of the fuel supply pump 21, so the higher the engine rotational speed, the higher the fuel pressure inside the fuel pressurizing chamber 26. Along with the rise in the fuel pressure in the fuel pressurizing chamber 26, the fuel pressure in the back pressure chamber 50 rises, so the higher the engine rotational speed, the higher the valve opening pressure of the valve body 49 and therefore the higher the engine rotational speed, the greater the maximum pressure of the fuel supplied to the fuel injector 10.

Note that the injection pump 11 is an improvement over the conventional distribution type fuel injection pump and is provided with a fuel adjustment mechanism comprised of a spill ring 39, governor mechanism 45, etc. As mentioned later, however, in the embodiment according to the present invention, the fuel injector 10 is comprised of a type of a fuel injector having a fuel storage chamber for storing fuel inside of the same and the amount of the fuel injection is controlled by controlling the valve opening time of the fuel injector 10 or the valve opening time and fuel injection pressure, so it is also possible to use an injection pump provided with just a fuel pressure adjustment means such as the injection pressure control valve 46 and not provide the spill ring 39, governor mechanism 45, etc.

Figure 4:
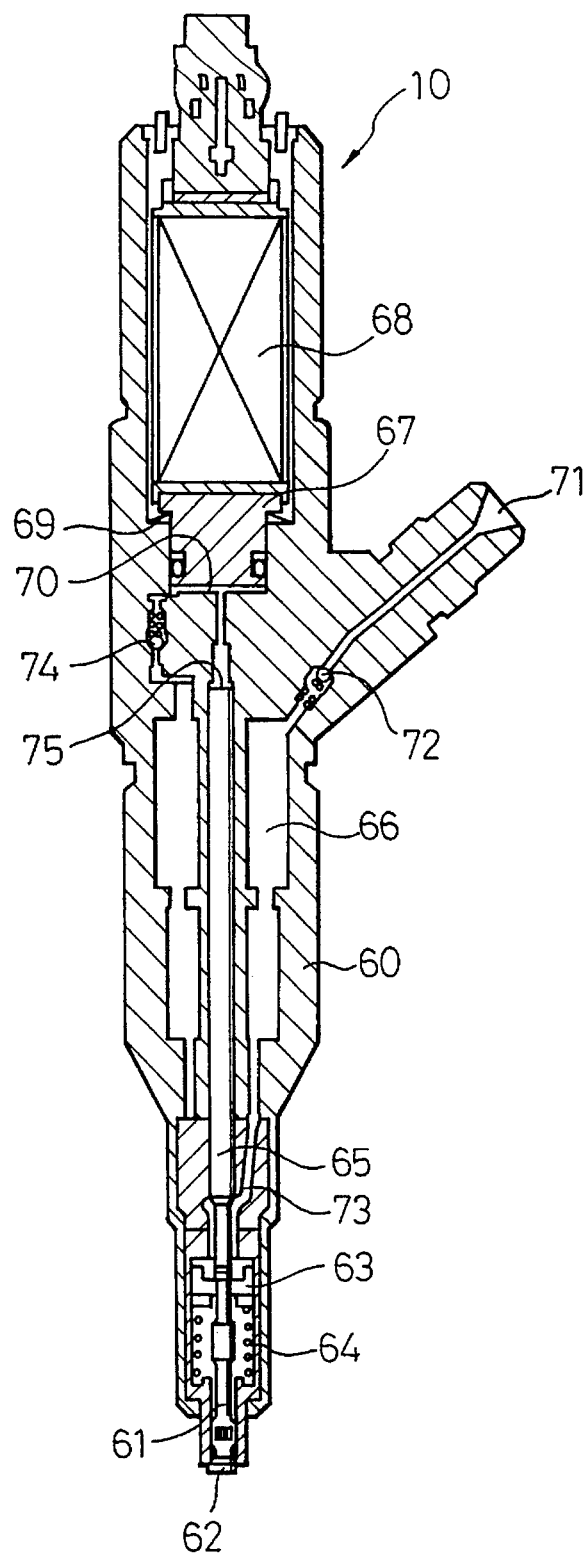
FIG. 4 is a side sectional view of a fuel injector.

FIG. 4 is a side sectional view of a fuel injector 10. Referring to FIG. 4, 61 is a needle slidable in the fuel injector body 60, 62 is a valve body formed integrally with the front end of the needle 61, 63 is a spring retainer attached to the top end of the needle 61, 64 is a compression spring biasing the spring retainer 63 in the upward direction, 65 is a rod arranged aligned with the needle 61, 66 is a fuel storage chamber having a capacity several tens of the amount of fuel injection at the time of maximum fuel injection, 67 is a piston arranged slidably in the injector body 60, 68 is a piezoelectric element for driving the piston 67, 69 is a plate spring biasing the piston 67 toward the piezoelectric element 68, 70 is a variable capacity chamber defined by the top face of the piston 67, and 71 is a fuel supply port.

The fuel supply port 71 is connected with the fuel discharge passage 37 (FIG. 3) corresponding to the injection pump 11 and therefore fuel discharged from the injection pump 11 is supplied to the fuel supply port 71. The fuel supplied to the fuel supply port 71 is supplied to the fuel storage chamber 66 through the check valve 72, which allows passage only from the fuel support port 71 to the fuel storage chamber 66. The fuel supplied in the fuel storage chamber 66 is led to around the front end of the needle 61 through the fuel passage 73 on the one hand and is supplied to the variable capacity chamber 70 through the check valve 74, which allows passage only from the fuel storage chamber 66 to the variable capacity chamber 70, on the other hand. The fuel supplied to the inside of the variable capacity chamber 70 is led to the top face 75 of the rod 65 and therefore the fuel pressure in the variable capacity chamber 70 acts on the top face 75 of the rod 65.

Figure 5:
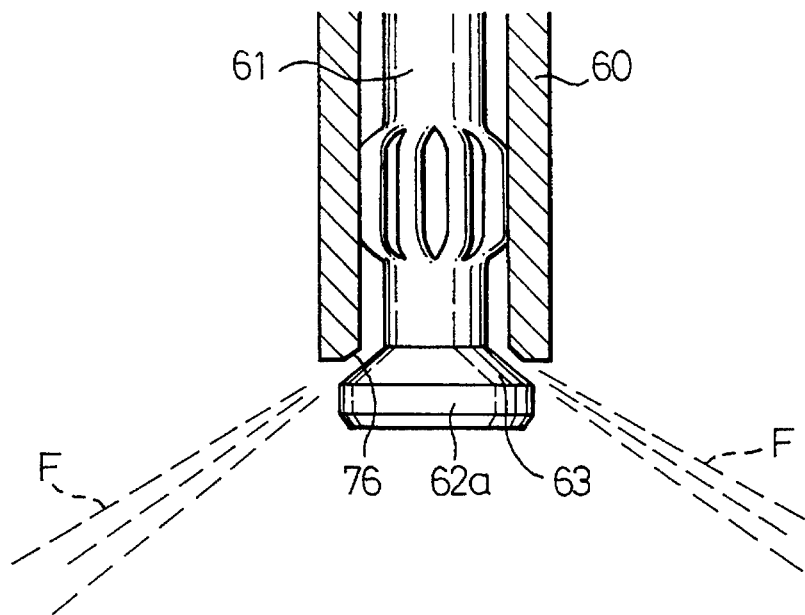
FIG. 5 is an enlarged side sectional view of a front end of a fuel injector.

FIG. 5 shows the front end of the needle 61. As shown in FIG. 5, the valve body 62 of the needle 61 has a conically shaped injected fuel guide face 62a, which injected fuel guide face 62a ordinarily sits on the seat face 76 by the spring force of the compression spring 64 (FIG. 4). At this time, the fuel injection from the fuel injector 10 is made to stop. When fuel is to be injected from the fuel injector 10, a charge is given to the piezoelectric element 68. When the piezoelectric element 68 is charged, the piezoelectric element 68 extends in the axial direction, so the piston 67 is made to descend. When the piston 67 is made to descend, the fuel pressure in the variable capacity chamber 70 rises and therefore the rod 65 is pushed down, so the needle 61 descends and the valve body 62 moves away from the seat face 76. As a result, the fuel inside the fuel storage chamber 66 is injected from between the valve body 61 and the seat face 76.

Next, if the charge given to the piezoelectric element 68 is released, the piezoelectric element 68 contracts in the axial direction and the piston 67 rises. As a result, the fuel pressure in the variable capacity chamber 70 falls, so the rod 65 and the needle 61 rise due to the spring force of the compression spring 64 and the injected fuel guide face 62a of the valve body 62 once again sits on the seat face 62. Accordingly, the injection action of the fuel is made to stop.

As shown in FIG. 5, when fuel is being injected, the injected fuel F is guided by the injected fuel guide face 62a of the valve body 62 and spreads from the front end of the needle 61, that is, from the nozzle port of the fuel injector 10, in a thin conical film. In the embodiment shown in FIG. 1, the fuel injector 10 is arranged at the center of the top portion of the combustion chamber 5 and therefore in the embodiment shown in FIG. 1, the fuel F is injected so as to spread in a thin conical film from the center of the top portion of the combustion chamber 5 toward the portion around the combustion chamber 5.

Figure 6:
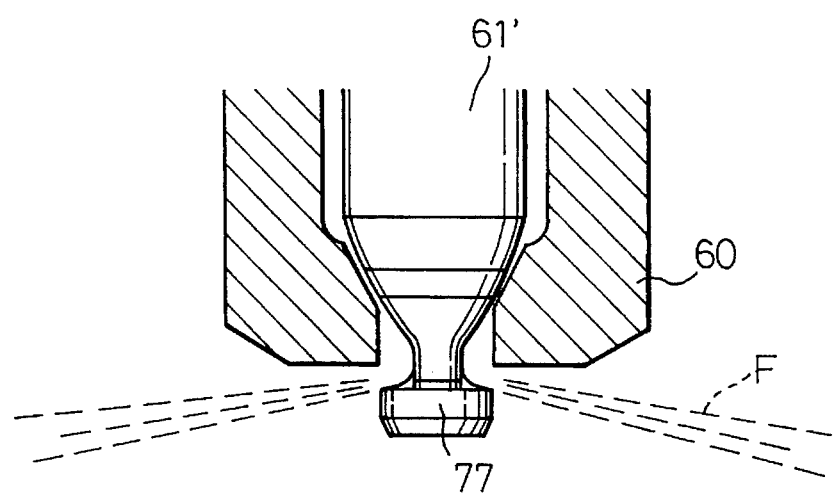
FIG. 6 is an enlarged side sectional view of a front end of a fuel injector showing another embodiment.

FIG. 6 shows another embodiment of the fuel injector 10. In this embodiment, conversely from FIG. 5, the fuel injection is performed when the needle 61' rises. When using this type of fuel injector 10, a guide member 77 for spreading the injected fuel F in a thin conical film is attached to the front end of the needle 61'.

The piezoelectric element 68 of the fuel injector 10 is controlled based on the output signals of an electronic control unit 80 shown in FIG. 1. The electronic control unit 80 is comprised of a digital computer and is provided with a ROM (read only memory) 82, RAM (random access memory) 83, CPU (microprocessor) 84, input port 85, and output port 86 connected through a bidirectional bus 81. The accelerator pedal 12 has a load sensor 90 for generating an output voltage proportional to the amount of depression of the accelerator pedal 12, which output voltage is input through an AD converter 87 to the input port 85. Further, a crank angle sensor 91 for generating an output pulse each time the engine rotates a predetermined crank angle is connected to the input part 85. The current crank angle and engine rotational speed are calculated from the output of the crank angle sensor 91. On the other hand, the output port 86 is connected to the piezoelectric element 68 of the fuel injector 10 through a drive circuit 88.

Next, an explanation will be made of an epochmaking new method of combustion which reduces the amount of generation of soot and $NO_x$ to substantially zero while referring to FIG. 7 to FIG. 10. Note that for this new method of combustion, the explanation will be made focusing on the time of high load operation, when the generation of soot and $NO_x$ are most likely to occur.

In the past, in so far as injection was performed atomizing the fuel to give an average particle size of the fuel particles of not more than 50 μm, no matter what the injection timing was set at and no matter what the fuel injection pressure was set at, it was difficult to simultaneously reduce the soot and $NO_x$. On top of this, it was impossible to reduce the generation of soot and $NO_x$ to substantially zero. This was because there were fundamental problems in the conventional method of combustion. That is, there may be considered to be two major factors making the simultaneous reduction of soot and $NO_x$ difficult in the conventional method of combustion. One of these was that part of the fuel is immediately vaporized just when the fuel is injected and this vaporized fuel causes rapid combustion to commence early. The other is that even if it is attempted to diffuse the fuel uniformly throughout the entire inside of the combustion chamber, the fuel in fact does not uniformly diffuse throughout the entire inside of the combustion chamber, but ends up gathering inside a limited region in the combustion chamber or else even if the fuel diffuses throughout substantially all the inside of the combustion chamber, an overly rich region and lean region end up mixed with each other.

That is, as explained above, if the combustion starts immediately after the start of the injection, the following injected fuel leaps into the combustion flame and therefore this injected fuel ends up burned in a state of insufficient air and accordingly soot is produced. Further, if an overly rich air fuel mixture is formed in the combustion chamber, the combustion of this overly rich air-fuel mixture also causes generation of soot. On the other hand, if the injected fuel gathers in a limited region in the combustion chamber and this gathered fuel is burned, the combustion temperature inside the region will become higher than the combustion temperature in the case of diffusion of the fuel in the combustion chamber and according $NO_x$ will be generated. Further, if the injected fuel is rapidly burnt early and the combustion pressure rapidly rises, the combustion temperature will further rise and accordingly further $NO_x$ will be generated.

Therefore, the present inventors thought that it would be possible to simultaneously reduce the soot and $NO_x$ by eliminating the above two factors, that is, preventing the early vaporization of injected fuel after injection and ensuring a uniform diffusion of the injected fuel in the combustion chamber. They conducted repeated experiments and as a result discovered that the amount of generation of soot and $NO_x$ could be reduced to substantially zero by considerably enlarging the mean particle size of the injected fuel from the mean particle size used in the conventional method of combustion and by making the injection timing considerably earlier than the injection timing usually used in the conventional method of combustion. This will be explained below.

Figure 7:
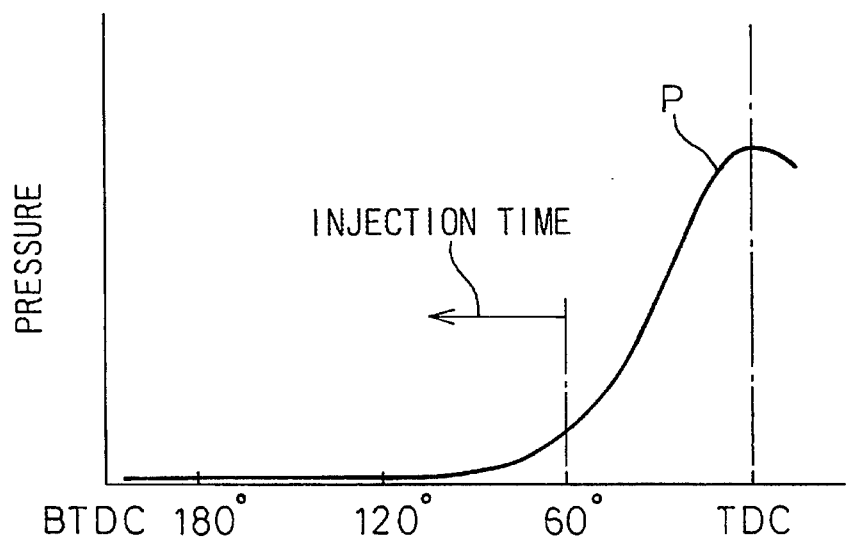
FIG. 7 is a view of the changes in pressure in the combustion chamber caused by just the compression action of a piston.

The curve in FIG. 7 shows the changes in the pressure P in the combustion chamber 5 caused by just the compression action of the piston 4. As will be understood from FIG. 7, the pressure P in the combustion chamber 5 rises sharply once past 60 degrees before top dead center BTDC of the compression stroke. This is regardless of the time of opening of the intake valve 6. No matter what reciprocating type internal combustion engine, the pressure P in the combustion chamber 5 changes as shown in FIG. 7.

Figure 8:
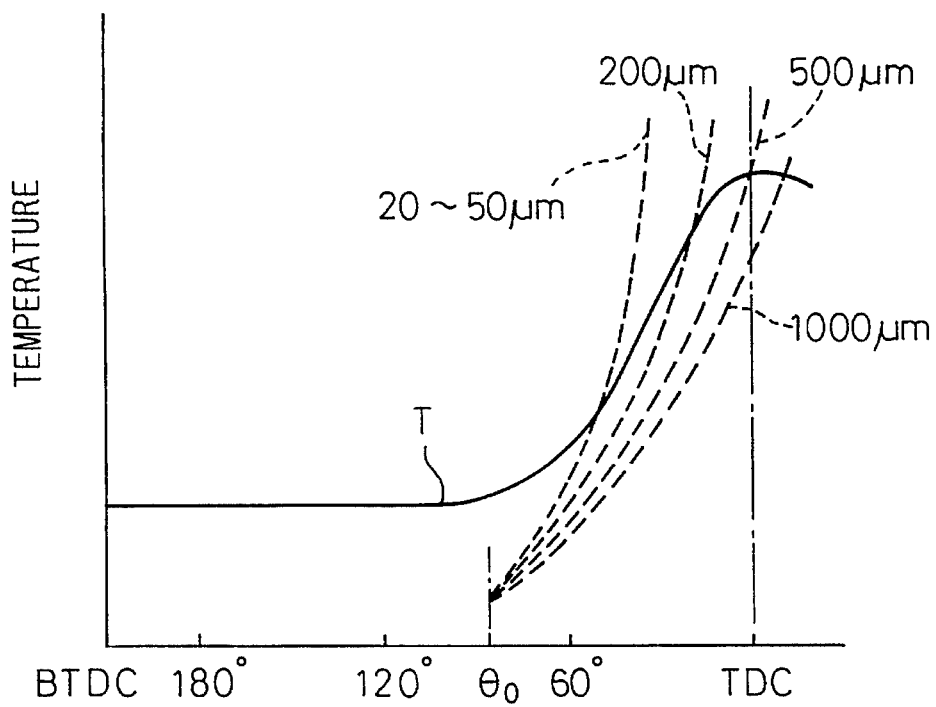
FIG. 8 is a view of the boiling point and the changes in temperature of the fuel particles.

The curve shown by the solid line in FIG. 8 shows the boiling temperature of the fuel i.e., the boiling point T at the different crank angles. If the pressure P in the combustion chamber 5 rises, the boiling point T of the fuel rises along with it, so the boiling point T of the fuel also rises sharply once past 60 degrees before top dead center BTDC of the compression stroke. On the other hand, the broken lines in FIG. 8 show the differences in the changes in temperature of the fuel particles caused by the differences of the particle size of the fuel particles just after injection. The temperature of the fuel particles just after injection is lower than the boiling point T determined by the pressure at that time. Next, the fuel particles receive the heat from the surroundings and rise in temperature. The rate of rise of temperature of the fuel particles at this time becomes faster the smaller the particle size.

That is, if it is assumed that the particle size of the fuel particles is from 20 µm to 50 µm, the temperature of the fuel particles rises rapidly after injection and reaches the boiling point T at a crank angle far before the top dead center TDC of the compression stroke. Further, as will be understood from FIG. 8, even when the particle size of the fuel particles is 200 µm, the temperature of the fuel particles reaches the boiling point T before the top dead center TDC of the compression stroke is reached and a rapid evaporating action of the fuel is started by the boiling. When the rapid evaporating action of the fuel is started before the top dead center TDC of the compression stroke is reached in this way, an explosive combustion occurs due to the fuel which evaporated at this time and accordingly a large amount of soot and $NO_x$ is generated as mentioned earlier.

As opposed to this, if the size of the fuel particles becomes larger than about 500 µm, the rate of rise of the temperature of the fuel particles becomes slower, so the temperature of the fuel particles will not reach the boiling point T until the top dead center TDC of the compression stroke or later. Accordingly, by making the size of the fuel particles larger than about 500 µm, there is no rapid evaporating action of the fuel due to boiling before the top dead center TDC of the compression stroke is reached and the rapid evaporating action of the fuel due to the boiling is started at the top dead center TDC of the compression stroke or after the top dead center TDC of the compression stroke.

Note that in actuality the fuel includes various components with different boiling points and that when one speaks of the "boiling point" of the fuel, there are a number of boiling points. Accordingly, when considering the boiling point of fuel, it is said to be preferable to consider the boiling point of the main component of the fuel. Further, the size of the injected fuel is never going to be completely uniform, so when considering the particle size of the injected fuel, it is said to be preferable to consider the mean particle size of the injected fuel, If considered in this way, by making the mean particle size of the injected fuel a size so that the temperature of the mean size fuel particles reaches the boiling point T of the main fuel component, determined by the pressure at that time, at about the top dead center TDC of the compression stroke or after the top dead center TDC of the compression stroke, there will be no rapid evaporation of fuel caused by boiling from the fuel particles until after injection when about the top dead center TDC of the compression stroke is reached and the rapid evaporation caused by boiling from the fuel particles will occur after about the top dead center TDC of the compression stroke.

Figure 9A:
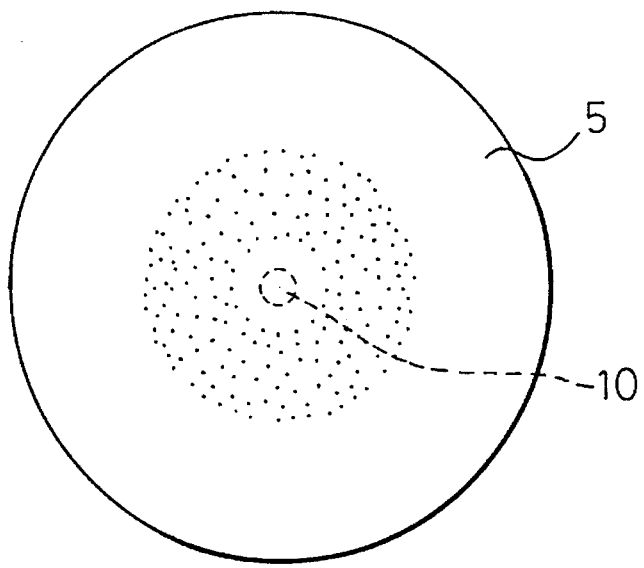
FIGS. 9A and 9B are views of the distribution of fuel particles.

Note that in this case, the rapid evaporating action of the fuel caused by the boiling is started substantially simultaneously in all fuel particles and the fuel from all fuel particles is ignited and started to be burned all at once. At this time, as shown in FIG. 9A, if the fuel particles were to collect at a part of the combustion chamber 5, then there would be insufficient air around the individual fuel particles, so the fuel particles would be made to be burned in a state of insufficiency of air and accordingly soot would be produced. To prevent the generation of soot in this way, when the fuel is ignited, it is preferable that all the fuel particles diffuse throughout the inside of the combustion chamber 5 as shown in FIG. 9B with a sufficient distance between fuel particles so that sufficient air is present around the fuel particles at the time of ignition of the fuel.

Figure 9B:
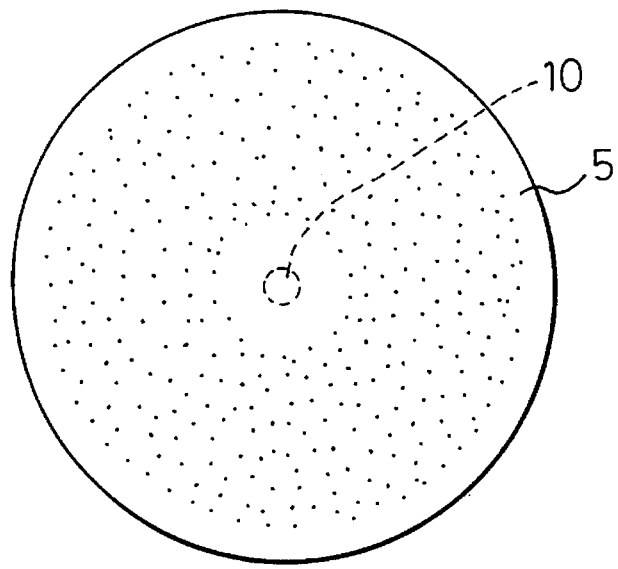

As shown in FIG. 9B, for the fuel particles to diffuse throughout the combustion chamber 5 at the time of ignition, the fuel must be injected from the fuel injector 10 when the pressure P in the combustion chamber 5 is low. That is, if the pressure P in the combustion chamber 5 becomes high, the air resistance becomes larger, so the distance of flight of the injected fuel becomes shorter and accordingly at this time the fuel particles cannot spread throughout the inside of the combustion chamber 5 as shown in FIG. 9A. As explained before, the pressure P inside the combustion chamber 5 rapidly rises and becomes high once past 60 degrees before top dead center BTDC of the compression stroke and if fuel is injected past 60 degrees before top dead center BTDC of the compression stroke, then the fuel particles will not sufficiently spread in the combustion chamber 5 as shown in FIG. 9A. As opposed to this, before 60 degrees before top dead center BTDC of the compression stroke, the pressure P inside the combustion chamber 5 is low and therefore if the fuel injection is performed before 60 degrees before top dead center BTDC of the compression stroke, the fuel particles will diffuse throughout the inside of the combustion chamber 5 as shown in FIG. 9B at the time of ignition. This can be confirmed from experiments. Note that in this case, so long as the timing of injection of fuel is made before 60 degrees before top dead center BTDC of the compression stroke, either the compression stroke or intake stroke is acceptable.

In this way, by injecting the fuel before 60 degrees before top dead center BTDC of the compression stroke and making the mean particle size of the fuel injected at this time a size whereby the temperature of the mean size fuel particles reaches the boiling point T of the main fuel component, determined by the pressure at that time, at about the top dead center TDC of the compression stroke or after the top dead center TDC of the compression stroke, there will be no rapid evaporation of the fuel caused by boiling by the fuel particles after injection until about the top dead center TDC is reached and the rapid evaporation of the fuel due to boiling of the fuel particles will start after about the top dead center TDC. At this time, the fuel particles diffuse through the entire combustion chamber 5 as shown in FIG. 9B.

If the evaporation of the fuel from the fuel particles is started, the fuel evaporated from the fuel particles can be ignited and burnt all at once. At this time, there is sufficient air around the individual fuel particles, so soot is not generated and further combustion is performed throughout the combustion chamber 5, so the combustion temperature becomes low and accordingly there is no $NO_x$ generated. Further, if there is a time difference in the start of the combustion by the individual fuel particles, the heat of combustion of the previous burnt fuel heats the combustion gas of the later burnt fuel, so the combustion gas temperature becomes higher and $NO_x$ ends up being generated. As mentioned above, however, the fuel evaporated from the individual fuel particles starts to be burned at substantially the same time, so in that sense too there is no generation of $NO_x$.

Figure 10:
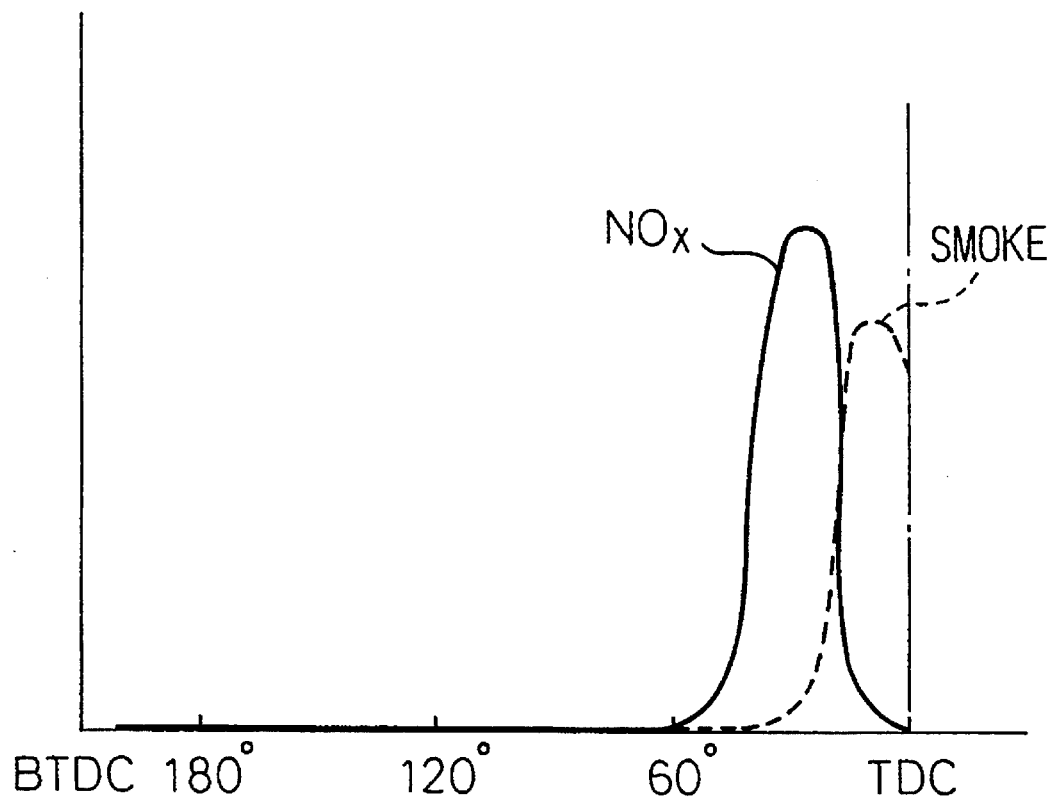
FIG. 10 is a view of the amount of generation of soot and $NO_x$.

FIG. 10 shows the results of experiments on the amount of generation of the soot, that is, smoke, and the amount of generation of $NO_x$ in the case of a fuel injection pressure of 20 MPa, an engine operation speed of 100 rpm, an amount of fuel injection of 15 mm$^3$, and different injection timings. If the fuel injection timing is set to be before 60 degrees before top dead center BTDC of the compression stroke, surprising it was learned that no smoke or $NO_x$ were generated at all.

As will be understood from the above explanation, the new method of combustion established by the present inventors lies in starting the fuel injection before 60 degrees before top dead center BTDC of the compression stroke and making the mean particle size of the fuel injected at this time a size whereby the temperature of the mean size fuel particles reaches the boiling point T of the main fuel component, determined by the pressure at that time, at about the top dead center TDC of the compression stroke or after the top dead center TDC of the compression stroke. Further, by using this new method of combustion, it is possible to make the amount of generation of the soot and $NO_x$ substantially zero.

In working this new method of combustion, the important point is that relatively large sized particles of fuel are made to diffuse throughout the combustion chamber 5 with a certain distance between the fuel particles. Therefore, when seen from the perspective of hardware, the fuel injection device, in particular the fuel injector 10, plays an important role in this new method of combustion. FIG. 4 shows an example of a fuel injector 10 suited for working this new combustion method. On the other hand, FIG. 11 shows a time chart for the fuel injection control. Accordingly, an explanation will be made of a new method of combustion of atomized fuel by the fuel injector 10 while referring to FIG. 11.

As mentioned earlier, when a drive signal of the piezoelectric element 68 is generated and the piezoelectric element 68 is charged, the fuel injection is started. As shown in FIG. 11, in the embodiment according to the present invention, pressurized fuel discharged from the fuel pump 11 for example 180 degrees before the injection timing is supplied to the fuel storage chamber 66 of the fuel injector 10. As a result, the fuel pressure in the fuel storage chamber 66 is made to rise. The fuel pressure inside the fuel storage chamber 66 at this time is about 20 MPa. Next, just a bit before 60 degrees before top dead center BTDC of the compression stroke, a drive signal of the piezoelectric element 68 is generated, whereby the piezoelectric element 68 is charged. When the piezoelectric element 68 is charged, the needle 61 descends and fuel in the fuel storage chamber 66 is ejected into the combustion chamber 5.

The fuel pressure in the fuel storage chamber 66 is about 20 MPa, which is considerably low. On the other hand, the amount of lift of the needle 61 is set larger than in general fuel injectors. Accordingly, when the needle 61 descends, fuel of a large particle size is injected all at once from the front end of the fuel injector 10. At this time, the pressure in the combustion chamber 5 is low and therefore the injected fuel sprays well to the peripheries of the combustion chamber 5. When the fuel injection is started as shown in FIG. 11, the pressure in the fuel storage chamber 66 falls and accordingly the fuel injection rate becomes the highest at the start of the injection and then gradually declines. When the pressure in the fuel storage chamber 66 falls, the speed of ejection of the fuel from the front end of the fuel injector 10 drops. Accordingly, the fuel injected later does not follow the fuel injected earlier and thus the fuel particles are uniformly diffused in the combustion chamber 5. Next, as shown in FIG. 11, the fuel injection is ended before reaching 60 degrees before top dead center BTDC of the compression stroke.

As mentioned earlier, the valve opening pressure of the valve body 46 of the fuel injector 46 attached to the injection pump 11 becomes higher the higher the engine rotational speed N. Therefore, the fuel pressure in the fuel storage chamber 66 when fuel discharged from the fuel pump 11 is supplied into the fuel storage chamber 66 becomes higher the higher the engine rotational speed N as shown in FIG. 12A. That is, it takes time for the injected fuel to spread to the peripheries of the combustion chamber 5 and, on the other hand, the time from when the injection is performed to when ignition occurs is shorter the higher the engine rotational speed N. Therefore, the fuel pressure inside the fuel storage chamber 66 is made higher the higher the engine rotational speed N and the injected fuel is made to spread faster in the combustion chamber 5 the higher the engine rotational speed N. By this, at the time of ignition, the fuel particles spread uniformly in the combustion chamber 5 as shown in FIG. 9B regardless of the engine rotational speed. Note that in this case, instead of controlling the fuel injection pressure, it is possible to make the injection starting timing earlier along with the rise of engine rotational speed N.

Further, in the embodiment according to the present invention, as shown in FIG. 12B, the fuel injection starting timing θS is made earlier the greater the amount L of depression of the accelerator pedal 12, that is, the higher the engine load. Further, the injection timing θT is stored in advance in the ROM 82 in the form of a map shown in FIG. 12C as a function of the amount L of depression of the accelerator pedal 12 and the engine rotational speed N.

Figure 13:
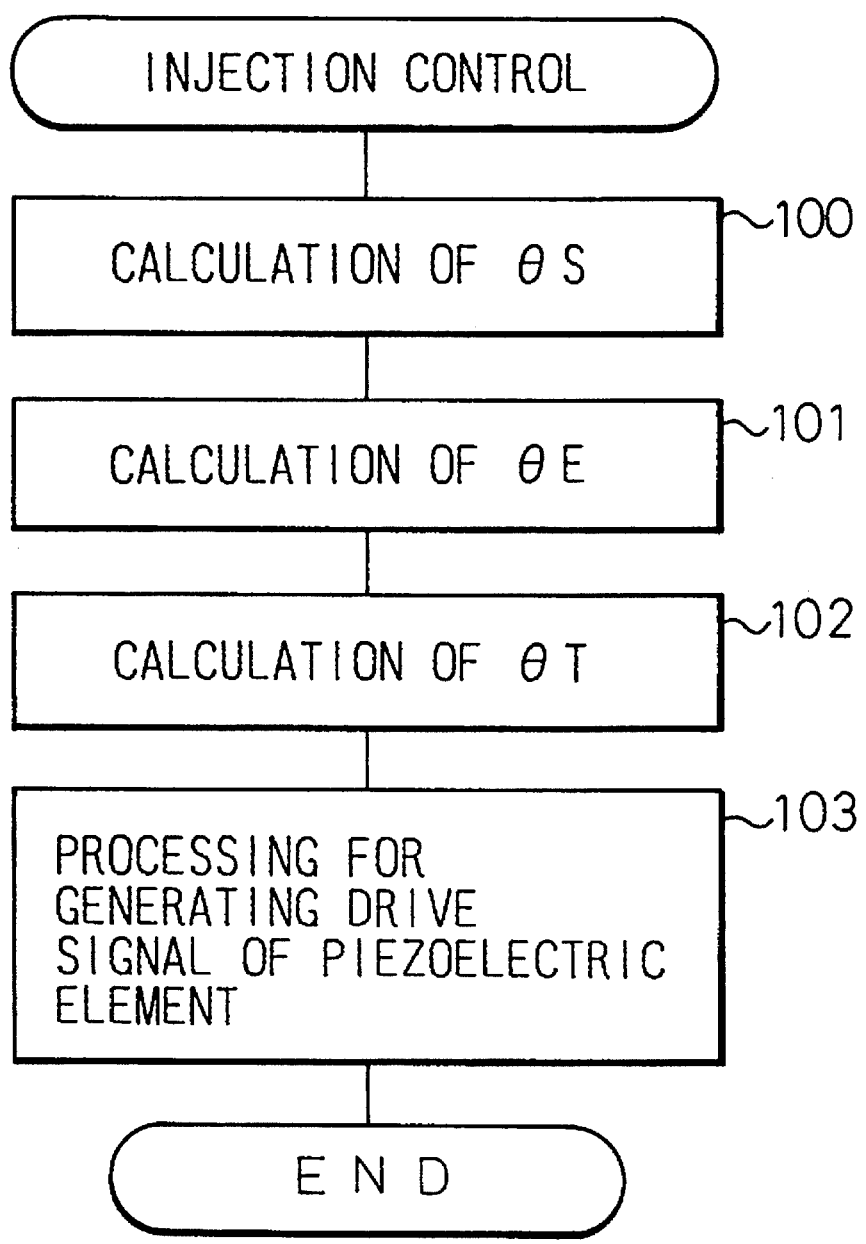
FIG. 13 is a flow chart for the injection control.

The control of the fuel injection from the fuel injector 10 is performed by the routine shown in FIG. 13. Note that this routine is performed by interruption every predetermined crank angle. Referring to FIG. 13, first, at step 100, the injection start timing θS is calculated from the relationship shown in FIG. 12B. Next, at step 101, the injection time θT is calculated from the relationship shown in FIG. 12C. Next, at step 102, the injection end timing θE is calculated from the injection start timing θS and the injection time θT. Next, at step 103, the drive signal driving the piezoelectric element 68 is generated for charging the piezoelectric element 68 at the injection start timing θS and for discharging the piezoelectric element 68 at the injection end timing θE.

FIG. 14 to FIG. 17 show another embodiment of the present invention. Note that in this embodiment, constituent elements similar to those in the embodiment shown in FIG. 1 to FIG. 5 are shown by the same references.

Figure 14:
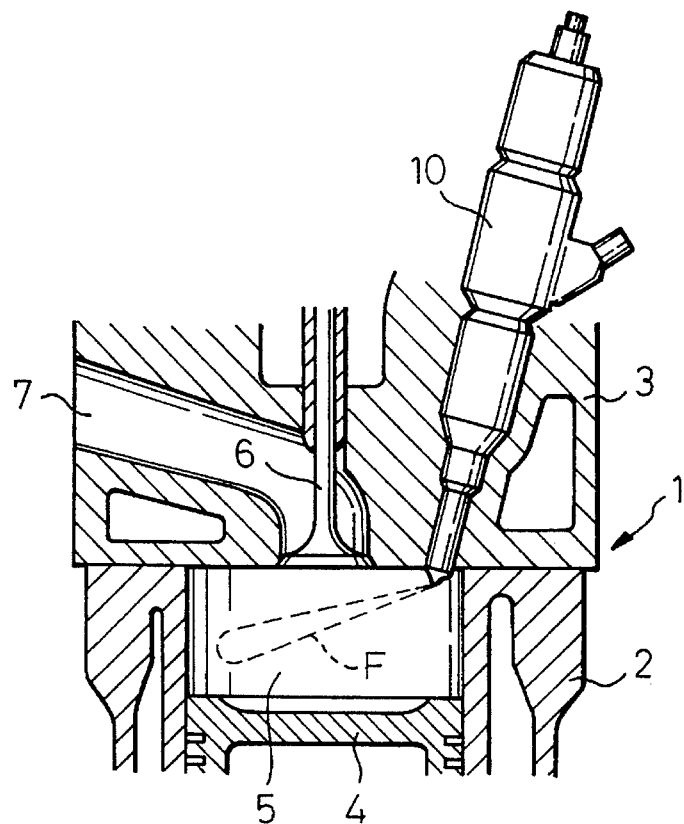
FIG. 14 is a side sectional view of another embodiment of a compression-ignition type engine.
Figure 15:
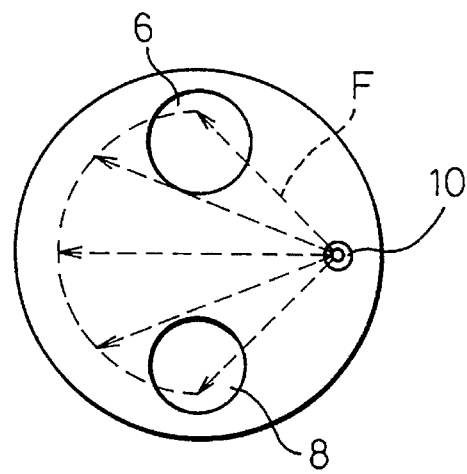
FIG. 15 is a bottom view of a cylinder head of FIG. 14.
Figure 16:
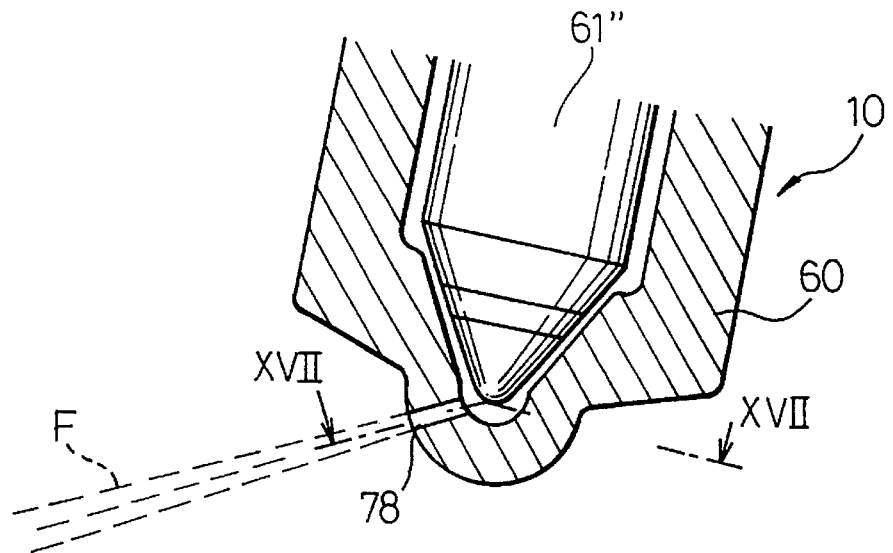
FIG. 16 is a side sectional view of a front end of a fuel injector of FIG. 14.
Figure 17:
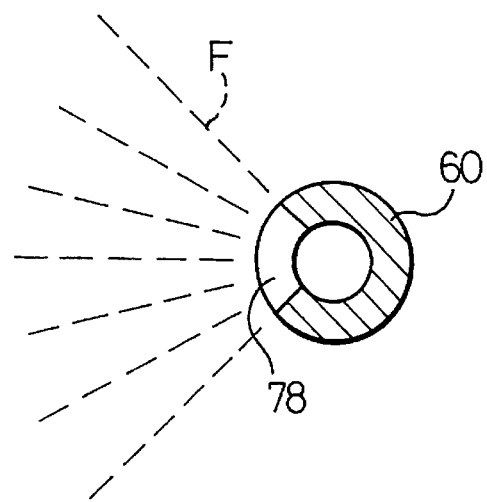
FIG. 17 is a sectional view along line XVII—XVII of FIG. 16.

As shown in FIG. 14 and FIG. 15, in this embodiment, a single intake valve 6 and a single exhaust valve 8 are provided. The fuel injector 10 is disposed near the combustion chamber 5. On the other hand, in this embodiment, as shown in FIG. 16 and FIG. 17, the nozzle port 78 of the fuel injector 10 is comprised of a slit with a sector shaped cross-section. When the needle 61" is made to rise, the fuel F is made to be injected in a thin sector-like film over the entire combustion chamber 5.

Figure 18:
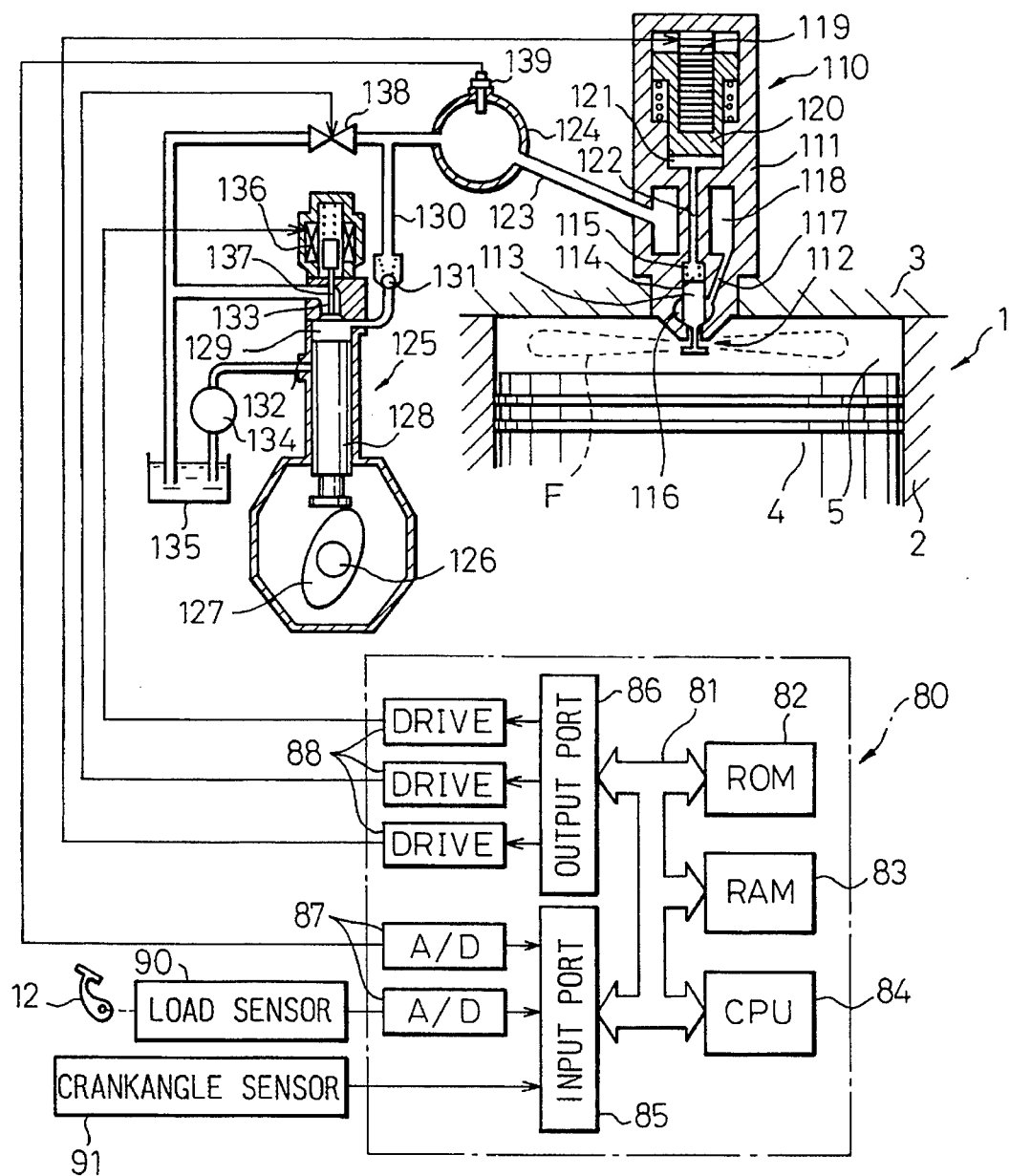
FIG. 18 is an overview of another embodiment of a compression-ignition type engine.

Still another embodiment will be shown in FIG. 18. In this embodiment, constituent elements similar to those in FIG. 1 will be shown by the same references.

In this embodiment, the fuel injector 110 is disposed at the center of the inner wall of the cylinder head 3. The body 111 of the fuel injector 110 is provided at its front end with a nozzle port 112 and is provided inside with a needle 113 for controlling the ejection of the fuel from the nozzle port 112. At the top face of the needle 113 is formed a back pressure chamber 114, in which back pressure chamber 114 is inserted a compression spring 115 for biasing the needle 113 in the direction of the nozzle port 112 at all times. Around the needle 113 is formed a fuel reservoir 116, which fuel reservoir 116 is made to communicate through the fuel passage 117 with a large capacity fuel storage chamber 118 which forms a ring shape. On the other hand, inside the fuel injector body 111 there is slidingly inserted a piston 120 which is driven by the piezoelectric element 119. The pressure control chamber 121 is defined by the front end face of this piston 120. The pressure control chamber 121 is made to be communicated with the back pressure chamber 114 through the fuel passage 122. As will be understood from FIG. 18, the fuel storage chamber 118 is formed around the fuel passage 122 and therefore the fuel storage chamber 118 is positioned near the needle 113.

The fuel storage chamber 118 is connected through a fuel supply pipe 123 to a fuel distribution pipe 124. To the inside of this fuel distribution pipe 124 is supplied fuel from the engine driven fuel pump 125. Fuel supplied in the fuel distribution pipe 124 is distributed and supplied to the fuel storage chamber 118 of the fuel injector 110 provided for each cylinder.

The fuel pump 125 is provided with a cam shaft 126 which is coupled with the engine crankshaft and made to rotate in synchronization with the engine crankshaft, a plunger 128 which is driven by the cam 127 formed on the cam shaft 126, and a fuel pressurizing chamber 129 which is defined by the top face of the plunger 128. This fuel pressurizing chamber 129 is connected to the fuel distribution pipe 124 through a fuel discharge pipe 130. Inside the fuel distribution pipe 124 is disposed a check valve 131 which enables passage only from the fuel pressurizing chamber 129 to the fuel distribution pipe 124. Further, the fuel pump 125 is provided with a fuel supply port 132 and a fuel spill port 133. The fuel supply port 132 is connected through a powered fuel pump 134 to a fuel tank 135. In the fuel spill port 133 is disposed a spill valve 137 which is controlled to open and close by a solenoid 136. Further, the fuel distribution pipe 124 is connected through a return control valve 138 to the fuel tank 135. In the fuel distribution pipe 124 is attached a pressure sensor 139 which generates an output voltage proportional to the fuel pressure inside the fuel distribution pipe 124. The output voltage of the pressure sensor 139 is input to the input port 85 through a corresponding AD converter 87. On the other hand, the output port 86 is connected through the corresponding drive circuits 88 to the piezoelectric element 119 of the fuel injector 110, the solenoid 136 for driving the spill valve 137, and a return control valve 138.

In this embodiment, the fuel pressure inside the fuel storage chamber 118, that is, the fuel pressure inside the fuel distribution pipe 124, is controlled in accordance with the amount of the injection requested. FIG. 19 shows the target fuel pressure $P_0$ inside the fuel distribution pipe 124. As will be understood from FIG. 19, the target fuel pressure $P_0$ increases the larger the amount L of depression of the accelerator pedal 12 and decreases the higher the engine rotational speed. That is, this target fuel pressure $P_0$ becomes higher the larger the requested amount of injection. Note that the relationship between the target fuel pressure $P_0$, the amount L of depression of the accelerator pedal 12, and the engine rotational speed N shown in FIG. 19 is stored in advance in the ROM 82.

Next, an explanation will be made of the method of control of the target fuel pressure $P_0$ with reference to FIG. 20 and FIG. 21.

In FIG. 18, when the plunger 128 descends and the fuel supply port 132 opens into the fuel pressurizing chamber 129, fuel is supplied from the fuel supply port 132 to the fuel pressurizing chamber 129. Next, the plunger 128 ascends and the fuel supply port 122 is closed by the plunger 128. At this time, as will be understood from FIG. 20, the spill valve 137 opens and accordingly when the plunger 128 rises, the fuel in the fuel pressurizing chamber 129 is returned through the fuel spill port 133 to the fuel tank 135. Next, as shown in FIG. 20, when the plunger 128 reaches the position θ degrees before the position giving the maximum lift of the plunger 128 in terms of the crank angle of the cam shaft, a pulse-like drive voltage is given to the solenoid 136, whereby the spill valve 137 is made to close.

If the spill valve 137 is made to close, the fuel in the fuel pressurizing chamber 129 is pressurized by the plunger 128. If the fuel pressure in the fuel pressurizing chamber 129 becomes higher than the fuel pressure in the fuel distribution pipe 124, pressurized fuel in the fuel pressurizing chamber 129 is supplied in the fuel distribution chamber 124. During this time, the fuel pressure in the fuel pressurizing chamber 129 becomes high pressure and therefore even if the solenoid 136 is deenergized, the spill valve 137 is held in the closed state. Next, when the plunger 128 reaches the maximum lift position, the supply of fuel from the fuel pressurizing chamber 129 to the fuel distribution pipe 124 is stopped, then when the plunger 128 starts to descend, the spill valve 137 opens.

In FIG. 20, if the timing θ for energizing the solenoid 136 is made later, the amount of fuel supplied to the fuel distribution pipe 124 becomes smaller and if the timing θ for energizing the solenoid 136 is made earlier, the amount of fuel supplied to the fuel distribution pipe 124 becomes larger. Accordingly, by controlling the timing θ for energizing the solenoid 136, it is possible to control the fuel pressure in the fuel distribution pipe 124.

Figure 21:
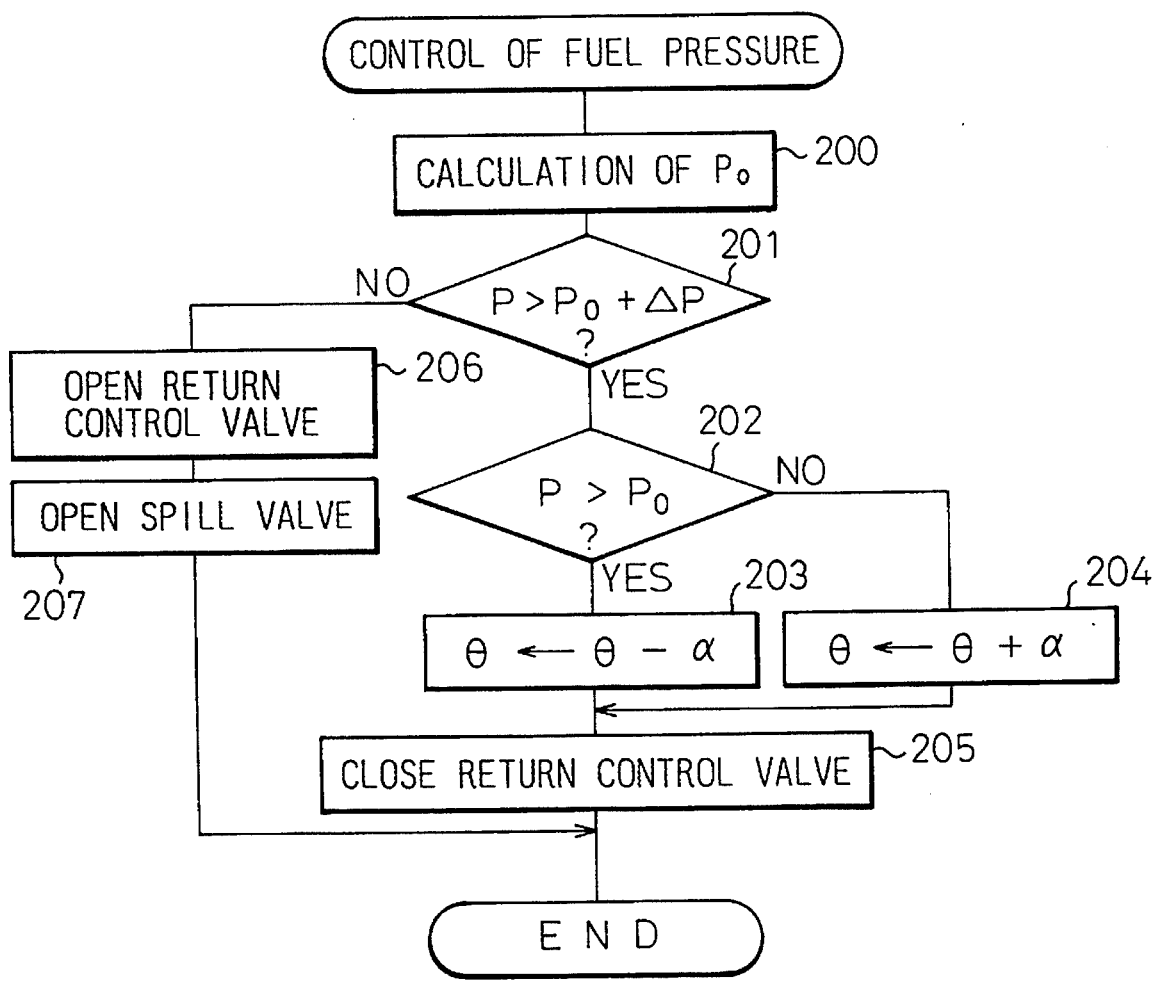
FIG. 21 is a flow chart for control of the fuel pressure.

FIG. 21 shows the control routine for maintaining the fuel pressure in the fuel distribution pipe 124 at the target fuel pressure $P_0$, which routine is executed by interruption every predetermined crank angle.

Referring to FIG. 21, first, at step 200, the target fuel pressure $P_0$ in the fuel distribution pipe 124 is calculated from the relationship shown in FIG. 19. Next, at step 201, it is determined if the fuel pressure P inside the fuel distribution pipe 124 detected by the pressure sensor 139 is higher than the value ($P_0+\Delta P$) obtained by adding a predetermined value $\Delta P$ to the target fuel pressure $P_0$. When $P \leq P_0+\Delta P$, the routine proceeds to step 202, wherein it is determined if the fuel pressure P inside the fuel distribution pipe 124 is higher than the target fuel pressure $P_0$. When $P>P_0$, the routine proceeds to step 203, where a predetermined value α is subtracted from the timing θ for biasing the solenoid 136. As a result, the timing θ is delayed, so the fuel pressure P in the fuel distribution pipe 124 is made to fall. Next, the routine proceeds to step 205, where the return control valve 138 is made to close. On the other hand, when $P \leq P_0$, the routine proceeds to step 204, where the predetermined value α is added to the timing θ for biasing the solenoid. Next, the routine proceeds to step 205. In this way, when $P \leq P_0+\Delta P$, the fuel pressure P in the fuel distribution pipe 124 is controlled to the target fuel pressure $P_0$.

As opposed to this, at step 201, if it is judged that $P>P_0+\Delta P$, that is, when the fuel pressure P in the fuel distribution pipe 124 is considerably higher than the target fuel pressure $P_0$, the routine proceeds to step 206, where the return control valve 138 is made to open, then at step 207, the spill valve 137 is held in the opened state. Accordingly, at this time, the fuel pressure P in the fuel distribution pipe 124 rapidly falls. When $P \leq P_0+\Delta P$, the routine proceeds to step 202, where the fuel pressure P in the fuel distribution pipe 124 is controlled to the target fuel pressure $P_0$. Therefore, if the target fuel pressure $P_0$ changes, the fuel pressure P in the fuel distribution pipe 124 changes following this and accordingly the fuel pressure P in the fuel distribution pipe 124, that is, the fuel pressure in the fuel storage chamber 118, is maintained at the target fuel pressure $P_0$.

Figure 22:
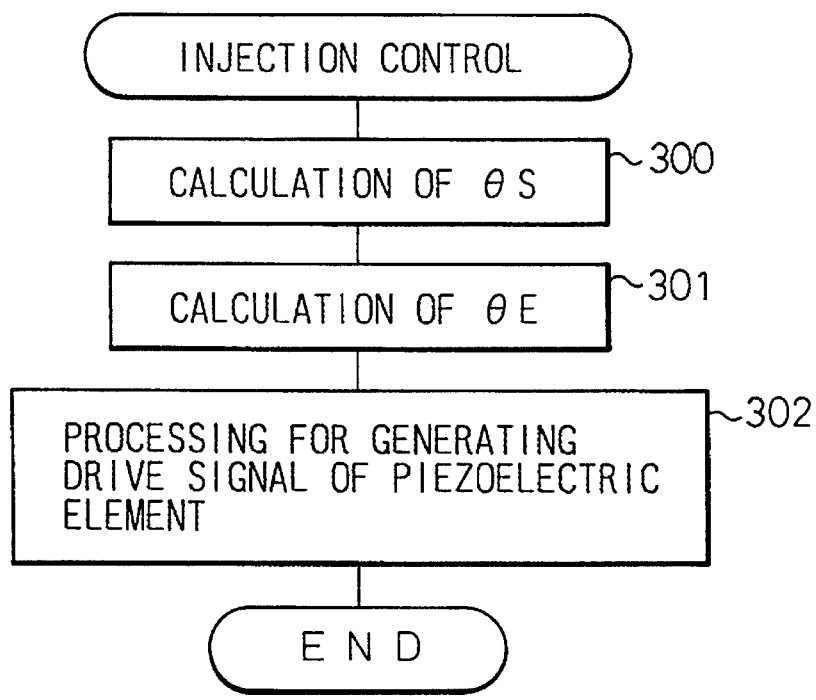
FIG. 22 is a flow chart for the control of the fuel injection.

On the other hand, in FIG. 18, if the charge in the piezoelectric element 119 is released, the piezoelectric element 119 contracts in the axial direction. As a result, the fuel pressure in the pressure control chamber 121 falls, so the fuel pressure in the back pressure chamber 114 falls and accordingly the needle 113 rises, so fuel injection is started from the nozzle port 112. Next, when the piezoelectric element 119 is charged, the piezoelectric element 119 extends in the axial direction. As a result, the fuel pressure in the pressure control chamber 121 rises, so the fuel pressure in the back pressure chamber 114 rises and accordingly the needle 113 descends, so the fuel injection from the nozzle port 112 is stopped In this embodiment as well, the fuel injection from the fuel injector 110 is performed at the compression stroke or intake stroke before 60 degrees before top dead center BTDC of the compression stroke. Further, in this embodiment, the injection time is maintained substantially constant regardless of the engine operation state. FIG. 22 shows an example of a routine for control of the fuel injection from the fuel injector 110.

Referring to FIG. 22, first, at step 300, the injection start timing θS is calculated, then, at step 301, a predetermined period is subtracted from the injection start timing θS, whereby the injection end timing θE is calculated. Next, at step 302, a drive signal for the piezoelectric element 119 is generated so as to discharge the piezoelectric element 119 at the injection start timing θS and to charge the piezoelectric element 119 at the injection end timing θE.

Figure 23:
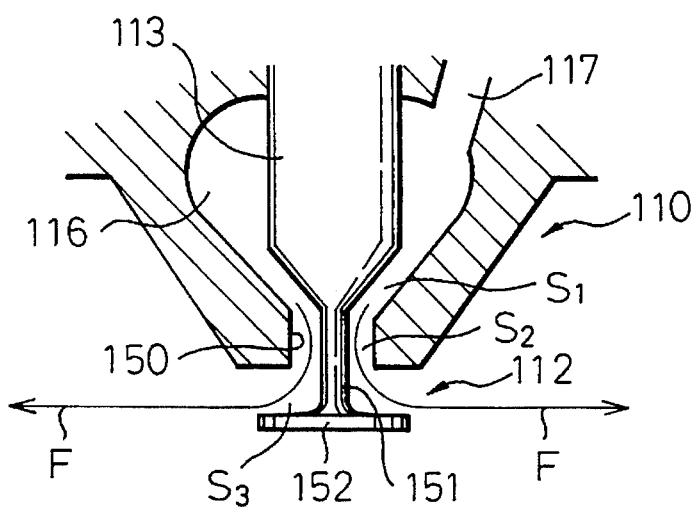
FIG. 23 is an enlarged side sectional view of the front end of a fuel injector.

FIG. 23 shows the front end of the fuel injector 110. As will be understood from FIG. 23, the construction of the front end of the fuel injector 110 is similar to the construction of the front end of the fuel injector shown in FIG. 6.

Referring to FIG. 23, at the front end of the fuel injector 110 there is formed a circular hole 150 extending in the axial direction of the needle 113. At the front end of the 113 is integrally formed a small diameter rod portion 151 passing through the inside of the circular hole 150 and projecting out into the combustion chamber 5. Further, at the front end of the small diameter rod portion 151 is affixed a disk 152 comprised of a circular plate. In the embodiment shown in FIG. 23, the flow channel area $S_2$ of the annular clearance formed between the circular hole 150 and needle small diameter rod portion 151 and the minimum flow channel area $S_3$ in the clearance formed between the front end face of the fuel injector 110 and the disk 152 are formed larger than the flow channel area $S_1$ of the annular clearance formed between the seat face of the needle 113 and the seat portion on the fuel injector 110 side at the time of the needle 113 opening the valve.

As shown in FIG. 23, when the needle 113 opens the valve, the pressurized fuel in the fuel storage chamber 118 flows out into the circular hole 150 through the fuel passage 117 and the fuel reservoir 116 and then the fuel is made to be oriented substantially perpendicular to the direction of flow by the disk as shown by the arrow mark F and spreads in a thin sheet film in the combustion chamber as shown by F in FIG. 18. At this time, as explained above, due to the relationship of $S_1<S_2$ and $S_1<S_3$, the injected fuel is subjected to a throttling action at the $S_1$ portion, that is, between the seat portion of the needle 113 and the seat portion of the fuel injector 110 side and is not subjected to any substantive throttling action between the inside of the circular hole 150 and the front end face of the fuel injector 110 and the disk 152.

If in this way there is no substantive throttling action between the inside of the circular hole 150 and front end face of the fuel injector 110 and the disk 152, the fuel will not be atomized much at all while flowing along the inside of the cylindrical hole 150 and the disk 152 and therefore the fuel will spread inside the combustion chamber in the form of liquid fuel droplets of a large particle size. In this case, however, theoretically, it is preferable that the fuel injection end instantaneously. What this goes to say is that if fuel injection is started instantaneously, the liquid fuel droplets uniformly disperse instantaneously and when the top dead center TDC of the compression stroke is passed, all the fuel droplets simultaneously evaporate, so combustion starts simultaneously around all the fuel droplets. An actual problem, however, is that it is difficult for the fuel injection to be ended in an instant. Therefore, in this embodiment, it is attempted to end the fuel injection within a small, substantially constant crank angle. This crank angle is preferably made as small as possible.

Further, to prevent the fuel from atomizing at the time of fuel injection, it is necessary that the fuel in the fuel storage chamber 118 be made injected into the combustion chamber 5 without it being subjected to any throttling action at all. It is, as an actual problem, difficult to make the fuel in the fuel storage chamber 118 be injected into the combustion chamber 5 without being subjected to any throttling action at all. In this embodiment, however, as mentioned earlier, there is the relationship of $S_1<S_2$ and $S_1<S_3$ (FIG. 23) and the fuel passing the seat portion of the needle 113 is not subsequently subjected to any substantial throttling action. Accordingly, in this embodiment, it is possible to considerably suppress the atomization of fuel at the time of fuel injection.

Further, it is preferable to complete the fuel injection in as short an injection period as possible as mentioned above. Accordingly, to end the fuel injection in a short injection period even when the amount of injection requested increases, it is necessary to increase the fuel injection pressure along with the increase of the amount of injection requested. Therefore, in this embodiment, as mentioned above, the greater the amount of injection required, the higher the fuel pressure in the fuel storage chamber 118.

Note that up to here, the explanation has been made of the case of application of the present invention to a four-stroke engine, but the present invention may also be applied to a two-stroke engine. In this case too, the fuel is injected during the compression stroke before 60 degrees before top dead center BTDC of the compression stroke or during the intake stroke where fresh air flowed in, that is, during the scavenging stroke.

While the invention has been described with reference to specific embodiments chosen for purposes of illustration, it should be apparent that numerous modifications could be made thereto by those skilled in the art without departing from the basic concept and scope of the invention.

We claim:

1. A compression-ignition type engine having a combustion chamber, comprising:
   injection means for injecting fuel in the combustion chamber and forming fuel droplets diffused in the combustion chamber, the mean value of the particle size of said fuel droplets being larger than a predetermined particle size at which the temperature of the fuel droplets having said predetermined particle size reaches a boiling point of a main ingredient of said fuel, which boiling point is determined by pressure in the combustion chamber, at about the top dead center of the compression stroke; and
   control means for controlling said injection means to carry out an injecting operation by said injection means at a predetermined timing during a period from the start of an intake stroke to approximately 60 degrees before top dead center of the compression stroke.

2. A compression-ignition type engine according to claim 1, wherein the mean particle size of the fuel droplets is more than about 500 μm.

3. A compression-ignition type engine according to claim 1, wherein said injecting means is provided with a fuel injector disposed in the combustion chamber, and said fuel injector has a fuel storage chamber therein.

4. A compression-ignition type engine according to claim 3, wherein said fuel storage chamber has a capacity several tens of times larger than the amount of fuel injection at a time of maximum fuel injection.

5. A compression-ignition type engine according to claim 3, wherein said injecting means is provided with a fuel pump for feeding fuel into said fuel storage chamber.

6. A compression-ignition type engine according to claim 5, wherein discharge control means is provided for controlling the amount of discharge of the fuel pump in accordance with the engine rotational speed so as to make the fuel pressure in said fuel storage chamber higher the higher the engine rotational speed.

7. A compression-ignition type engine according to claim 5, wherein discharge control means is provided for controlling the amount of discharge of the fuel pump in accordance with the engine load so as to make the fuel pressure in said fuel storage chamber higher the higher the engine load.

8. A compression-ignition type engine according to claim 7, wherein said control means maintains substantially constant the injection time of the fuel regardless of the engine operation state.

9. A compression-ignition type engine according to claim 1, wherein said control means makes the injection timing earlier the higher the engine rotational speed in accordance with the rotational speed of the engine.

10. A compression-ignition type engine according to claim 1, wherein said control means makes the injection timing earlier the higher the engine load in accordance with the load of the engine.

11. A compression-ignition type engine according to claim 1, wherein said injection means is provided with a fuel injector disposed in the combustion chamber and said fuel injector injects fuel spreading in a thin film state throughout the entire inside of the combustion chamber.

12. A compression-ignition type engine according to claim 11, wherein said fuel injector is disposed at the center of an inner wall of the cylinder head defining the combustion chamber and fuel in a thin conical film is injected from said fuel injector.

13. A compression-ignition type engine according to claim 12, wherein said fuel injector is provided with a needle which projects outside from a front end of the fuel injector, a valve portion which is formed at an outside projecting portion of the needle, and an annular nozzle port formed between the valve portion and the front end face of the fuel injector, the nozzle port opening when the needle is made to move outward and fuel ejected from the nozzle port spreading in a thin conical film from the valve portion.

14. A compression-ignition type engine according to claim 12, wherein said fuel injector is provided with a needle and a guide member disposed outward of a front end of the fuel injector and coaxially with the needle and connected to the needle, the fuel injection being started when the needle is made to move inward and the injected fuel then being spread in a thin conical film by the guide member.

15. A compression-ignition type engine according to claim 11, wherein said fuel injector is disposed at a peripheral area of the inner wall of the cylinder head defining the combustion chamber and fuel is injected in a thin sector-like film from the fuel injector.

16. A compression-ignition type engine according to claim 15, wherein said fuel injector is provided with a nozzle port comprised of a slit of a sector-like cross-section.

17. A compression-ignition type engine according to claim 1, wherein said injection means is provided with a fuel injector controlled in injection by a piezoelectric element.

18. A combustion method of compression-ignition type engine having a combustion chamber, comprising the steps of:

injecting fuel in the combustion chamber at a predetermined time during a period from the start of an intake stroke to 60 degrees before top dead center of the compressions stroke;

forming fuel droplets dispersed in the combustion chamber, the mean value of the particle size of said fuel droplets being larger than a predetermined particle size at which the temperature of the fuel droplets having said predetermined particle size reaches a boiling point of a main ingredient of said fuel, which boiling point is determined by pressure in the combustion chamber, at almost the top dead center of the compression stroke;

preventing fuel from being vaporized by boiling from said fuel droplets until a crankshaft reaches about top dead center of the compression stroke after the injection of fuel is started; and vaporizing fuel from said fuel droplets by boiling and starting a combustion of vaporized fuel after about the top dead center of the compression stroke.

19. A combustion method according to claim 18, wherein the mean particle size of the liquid fuel droplets is more than about 500 μm.

20. A combustion method according to claim 18, wherein the fuel injection rate at the start of the fuel injection is the highest and then the fuel injection rate gradually declines until the fuel injection is ended.

21. A combustion method according to claim 18, wherein the injection timing is made earlier the higher the engine rotational speed.

22. A combustion method according to claim 18, wherein the injection timing is made earlier the higher the engine load.

* * * * *

UNITED STATES PATENT AND TRADEMARK OFFICE
CERTIFICATE OF CORRECTION

PATENT NO. : 5,467,757
DATED : November 21, 1995
INVENTOR(S) : Hiromichi YANAGIHARA et al.

It is certified that error appears in the above-indentified patent and that said Letters Patent is hereby corrected as shown below:

| Column | Line | |
|---|---|---|
| 2 | 36 | Change "fuedl" to --fuel--. |
| 7 | 19 | Change "according" to --accordingly--. |
| 8 | 31 | After "fuel" change "," to --.--. |
| 9 | 57 | Change "surprising" to --surprisingly--. |
| 14 | 31 | Before "113" insert --needle--. |
| 15 | 16 | After "be" delete "made". |

Signed and Sealed this

Twenty-third Day of April, 1996

Attest:

BRUCE LEHMAN

Attesting Officer

Commissioner of Patents and Trademarks